(12) United States Patent
Crabtree et al.

(10) Patent No.: US 12,493,914 B2
(45) Date of Patent: *Dec. 9, 2025

(54) SYSTEM AND METHOD FOR MODELING COMPLEX SYSTEMS WITH DISTRIBUTED ACTOR-BASED SIMULATION

(71) Applicant: QOMPLX LLC, Reston, VA (US)

(72) Inventors: Jason Crabtree, Vienna, VA (US); Andrew Sellers, Monument, CO (US)

(73) Assignee: QOMPLX LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/593,892

(22) Filed: Mar. 2, 2024

(65) Prior Publication Data

US 2024/0202834 A1 Jun. 20, 2024

Related U.S. Application Data

(63) Continuation of application No. 17/360,007, filed on Jun. 28, 2021, which is a continuation-in-part of (Continued)

(51) Int. Cl.
*G06Q 40/08* (2012.01)
*G06N 7/01* (2023.01)
(Continued)

(52) U.S. Cl.
CPC ............ *G06Q 40/08* (2013.01); *G06N 7/01* (2023.01); *G06Q 30/0201* (2013.01); *G06Q 50/01* (2013.01)

(58) Field of Classification Search
CPC .... G06Q 40/08; G06Q 30/0201; G06Q 50/01; G06Q 40/06; G06N 7/01; G06N 3/08; G06N 20/00; G06N 5/022
(Continued)

(56) References Cited

U.S. PATENT DOCUMENTS

| 5,669,000 A | 9/1997 | Jessen et al. |
| 6,256,544 B1 | 7/2001 | Weissinger |

(Continued)

FOREIGN PATENT DOCUMENTS

| WO | 2014159150 A1 | 10/2014 |
| WO | 2015089463 A1 | 6/2015 |
| WO | 2017075543 A1 | 5/2017 |

OTHER PUBLICATIONS

Huang, Alex, A Comparison of Value at Risk Approaches and a New Method with Extreme Value Theory and Kernel Estimator.
(Continued)

*Primary Examiner* — Bryan F Wright
(74) *Attorney, Agent, or Firm* — Galvin Patent Law LLC; Brian R. Galvin

(57) ABSTRACT

Fully integrated collection of relevant data, analysis of that data and generation of both analysis-driven decisions and analysis driven simulations of alternate candidate actions. This organizational operating system may be used predict the outcome of enacting candidate decisions based upon past and current data retrieved from both within the corporation and from a plurality of external sources pre-programmed into the system. Simulations using this data and predefined parameters to create models of actors are then run. Risk to value estimates of candidate decisions are also calculated.

15 Claims, 13 Drawing Sheets

Related U.S. Application Data application No. 16/575,929, filed on Sep. 19, 2019, now Pat. No. 11,074,652, which is a continuation-in-part of application No. 16/191,054, filed on Nov. 14, 2018, now Pat. No. 10,681,074, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, which is a continuation-in-part of application No. 14/925,974, filed on Oct. 28, 2015, now abandoned, said application No. 15/655,113 is a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned.

(51) Int. Cl.
  *G06Q 30/0201* (2023.01)
  *G06Q 50/00* (2012.01)

(58) Field of Classification Search
  USPC .......................................................... 705/4
  See application file for complete search history.

(56) References Cited

U.S. PATENT DOCUMENTS

| | | |
|---|---|---|
| 6,477,572 B1 | 11/2002 | Elderton et al. |
| 7,072,863 B1 | 7/2006 | Phillips et al. |
| 7,657,406 B2 | 2/2010 | Tolone et al. |
| 7,698,213 B2 | 4/2010 | Lancaster |
| 7,739,653 B2 | 6/2010 | Venolia |
| 8,065,257 B2 | 11/2011 | Kuecuekyan |
| 8,145,761 B2 | 3/2012 | Liu et al. |
| 8,281,121 B2 | 10/2012 | Nath et al. |
| 8,615,800 B2 | 12/2013 | Baddour et al. |
| 8,788,306 B2 | 7/2014 | Delurgio et al. |
| 8,793,758 B2 | 7/2014 | Raleigh et al. |
| 8,914,878 B2 | 12/2014 | Burns et al. |
| 8,997,233 B2 | 3/2015 | Green et al. |
| 9,134,966 B2 | 9/2015 | Brock et al. |
| 9,141,360 B1 | 9/2015 | Chen et al. |
| 9,152,727 B1 | 10/2015 | Balducci et al. |
| 9,231,962 B1 | 1/2016 | Yen et al. |
| 9,602,530 B2 | 3/2017 | Ellis et al. |
| 9,654,495 B2 | 5/2017 | Hubbard et al. |
| 9,672,355 B2 | 6/2017 | Titonis et al. |
| 9,686,308 B1 | 6/2017 | Srivastava |
| 9,691,046 B1 * | 6/2017 | Adler ................. G06Q 10/0635 |
| 9,762,443 B2 | 9/2017 | Dickey |
| 9,887,933 B2 | 2/2018 | Lawrence, III |
| 9,946,517 B2 | 4/2018 | Talby et al. |
| 10,061,635 B2 | 8/2018 | Ellwein |
| 10,102,480 B2 | 10/2018 | Dirac et al. |
| 10,210,246 B2 | 2/2019 | Stojanovic et al. |
| 10,210,255 B2 | 2/2019 | Crabtree et al. |
| 10,242,406 B2 | 3/2019 | Kumar et al. |
| 10,248,910 B2 | 4/2019 | Crabtree et al. |
| 10,318,882 B2 | 6/2019 | Brueckner et al. |
| 10,367,829 B2 | 7/2019 | Huang et al. |
| 10,511,498 B1 | 12/2019 | Narayan et al. |
| 2003/0041254 A1 | 2/2003 | Challener et al. |
| 2003/0145225 A1 | 7/2003 | Bruton et al. |
| 2005/0289072 A1 | 12/2005 | Sabharwal |
| 2006/0149575 A1 | 7/2006 | Varadarajan et al. |
| 2007/0150744 A1 | 6/2007 | Cheng et al. |
| 2009/0064088 A1 | 3/2009 | Barcia et al. |
| 2009/0089227 A1 | 4/2009 | Sturrock et al. |
| 2009/0182672 A1 | 7/2009 | Doyle |
| 2009/0222562 A1 | 9/2009 | Liu et al. |
| 2009/0293128 A1 | 11/2009 | Lippmann et al. |
| 2010/0223226 A1 | 9/2010 | Alba et al. |
| 2011/0060821 A1 | 3/2011 | Loizeaux et al. |
| 2011/0087888 A1 | 4/2011 | Rennie |
| 2011/0154341 A1 | 6/2011 | Pueyo et al. |
| 2012/0066667 A1 | 3/2012 | Mascaro et al. |
| 2012/0088209 A1 * | 4/2012 | Poole .................. G09B 9/003 434/11 |
| 2012/0266244 A1 | 10/2012 | Green et al. |
| 2012/0296845 A1 | 11/2012 | Andrews et al. |
| 2013/0073062 A1 | 3/2013 | Smith et al. |
| 2013/0132149 A1 | 5/2013 | Wei et al. |
| 2013/0191185 A1 * | 7/2013 | Galvin .................. G06Q 10/10 705/7.36 |
| 2013/0191416 A1 | 7/2013 | Lee et al. |
| 2013/0246996 A1 | 9/2013 | Duggal et al. |
| 2013/0304623 A1 | 11/2013 | Kumar et al. |
| 2014/0156806 A1 | 6/2014 | Karpistsenko et al. |
| 2014/0244612 A1 | 8/2014 | Bhasin et al. |
| 2014/0279762 A1 | 9/2014 | Xaypanya et al. |
| 2014/0324521 A1 | 10/2014 | Mun |
| 2015/0149979 A1 | 5/2015 | Talby et al. |
| 2015/0163242 A1 | 6/2015 | Laidlaw et al. |
| 2015/0169294 A1 | 6/2015 | Brock et al. |
| 2015/0195192 A1 | 7/2015 | Vasseur et al. |
| 2015/0236935 A1 | 8/2015 | Bassett |
| 2015/0281225 A1 | 10/2015 | Schoen et al. |
| 2015/0317481 A1 | 11/2015 | Gardner et al. |
| 2015/0339263 A1 | 11/2015 | Ata et al. |
| 2015/0347414 A1 | 12/2015 | Xiao et al. |
| 2015/0371224 A1 | 12/2015 | Lingappa |
| 2016/0004858 A1 | 1/2016 | Chen et al. |
| 2016/0028758 A1 | 1/2016 | Ellis et al. |
| 2016/0072845 A1 | 3/2016 | Chiviendacz et al. |
| 2016/0078361 A1 | 3/2016 | Brueckner et al. |
| 2016/0099960 A1 | 4/2016 | Gerritz et al. |
| 2016/0105454 A1 | 4/2016 | Li et al. |
| 2016/0119365 A1 | 4/2016 | Barel |
| 2016/0140519 A1 | 5/2016 | Trepca et al. |
| 2016/0275123 A1 | 9/2016 | Lin et al. |
| 2016/0285732 A1 | 9/2016 | Brech et al. |
| 2016/0342606 A1 | 11/2016 | Mouel et al. |
| 2016/0350442 A1 | 12/2016 | Crosby |
| 2016/0364307 A1 | 12/2016 | Garg et al. |
| 2017/0019678 A1 | 1/2017 | Kim et al. |
| 2017/0063896 A1 | 3/2017 | Muddu et al. |
| 2017/0083380 A1 | 3/2017 | Bishop et al. |
| 2017/0126712 A1 | 5/2017 | Crabtree et al. |
| 2017/0139763 A1 | 5/2017 | Ellwein |
| 2017/0149802 A1 | 5/2017 | Huang et al. |
| 2017/0193110 A1 | 7/2017 | Crabtree et al. |
| 2017/0206360 A1 | 7/2017 | Brucker et al. |
| 2017/0322959 A1 | 11/2017 | Tidwell et al. |
| 2017/0323089 A1 | 11/2017 | Duggal et al. |
| 2018/0197128 A1 | 7/2018 | Carstens et al. |
| 2018/0300930 A1 | 10/2018 | Kennedy et al. |
| 2019/0082305 A1 | 3/2019 | Proctor |
| 2019/0095533 A1 | 3/2019 | Levine et al. |
| 2020/0051460 A1 * | 2/2020 | Bedor .................. G09B 19/22 |

OTHER PUBLICATIONS

Simonian et al., Robust Value-At-Risk: An Information Theoretic Approach.

* cited by examiner

SYSTEM AND METHOD FOR MODELING COMPLEX SYSTEMS WITH DISTRIBUTED ACTOR-BASED SIMULATION

CROSS-REFERENCE TO RELATED APPLICATIONS

Priority is claimed in the application data sheet to the following patents or patent applications, each of which is expressly incorporated herein by reference in its entirety:
Ser. No. 17/360,007
Ser. No. 16/575,929
Ser. No. 16/191,054
Ser. No. 15/655,113
Ser. No. 15/616,427
Ser. No. 14/925,974
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536

BACKGROUND OF THE INVENTION

Field of the Invention

The present invention is in the field of use of computer systems in complex systems operations and planning. Specifically, the present invention is related to the problem of accurately and detailed predictive simulation of large, complex systems.

Discussion of the State of the Art

Over the past decade, the amount of operational, infrastructure, risk management and information available to decision makers from such sources as ubiquitous sensors found on a equipment or available from third party sources, detailed cause and effect data, and process monitoring software has expanded to the point where the data has overwhelmed leaders' abilities to follow all of it and certainly to interpret and make meaningful use of available data in a given environment. In other words, the torrent of information now available to a decision maker or group of decision makers has far outgrown the ability of those most in need of its use to either fully follow it or to reliably use it. Failure to recognize important trends or become aware of information in a timely fashion has led to highly visible customer facing outages at NETFLIX™, FACEBOOK™, and UPS™ over the past few years, just to list a few.

There have been several developments in recently that have arisen with the purpose of streamlining or automating either data analysis or decision processes. PALANTIR™ offers software to isolate patterns in large volumes of data, DATABRICKS™ offers custom analytics services, ANAPLAN™ offers financial impact calculation services and there are other software sources that mitigate some aspect of data relevancy identification, analysis of that data and decision automation, but none of these solutions handle more than a single aspect of the whole task. This insinuates the technology being used in the decision process as one of the variables as data from one software package often must be significantly and manually transformed to be introduced into the software for the next analysis, if appropriate software exists. This step is both inefficient use of human resources and has potential to introduce error at a critical process point.

There have also been great progress made in the area of accurate system modeling and simulation. As one will quickly surmise, reliable simulation of prospective systems or ventures, any novel system or venture, in fact, has very high potential to save great amounts of capital, both monetary and human, can often be run to some completion point much more rapidly than the real process and, if unforeseen inefficiencies or risks are uncovered, or even if the original plan fails outright, changes to specific parameters and assumptions can be rapidly and efficiently made until an optimized and successful solution is found or the plan is be shelved, all with a minimal use of resources and loss of capital. As computing processing power has increased, more traditional modeling and simulation methodology such as system dynamic, in which actors of the same type such as a car or a truck will have their descriptive data, such as traveling speed or weight highly aggregated in a simulated system and then each of those aggregated actor types will represent that type during simulation interactions; or discrete event simulation where the simulation is processed by dividing events within it usually thought of as continuous into a series of discrete subevents to show the effects of performing a lengthy process on an object or group of objects, such as a trip into a hospital emergency room being: "open transport vehicle door," "place patient into vehicle," "drive vehicle 0.4 miles to corner of patient's home road," . . . ; . . . ; "record patient health insurance information in health computing system," . . . ; . . . ; "examine by doctor," . . . ; . . . ; "collect payment not covered by insurance," "patient departs hospital," where even the steps described may be further subdivided; have found highly useful resurgence. As one might realize, the significant ascent of computing power has given rise to a simulation engine that promises much more accurate modeling by allowing each object, also possibly denoted agent or actor, in a simulation to have its own individual model. This capability allows one to experiment with effects that these differences between individuals of like type have on the progression and outcome of a simulation, but may also require significantly more processing time and data bandwidth to complete and so are often used in smaller scale simulation than a system dynamics simulation.

Currently there are multiple Open Source simulation engines available. DEUS, a discrete event simulator engine; OM-NET++, another discrete event simulator engine; Siafu, an agent-based simulation engine; and a discrete event-based simulator engine with high scalability. All of these offerings suffer, to varying extents from limited scalability and deployability. As outlined above for other data capture and transformation offerings, these simulation engines act as another, detached service within a complete analysis and prediction system into which data from other services must be often first re-formatted and then manually entered. Further many accurate, yet executable simulations rely on multiple simulation methods, system dynamics, discrete event and agent based, depending on the portion of the simulation being represented and the minimal accuracy needed to produce a reliable outcome.

What is needed is a fully integrated system that retrieves relevant information from many diverse sources, identifies and analyzes that high volume data, transforming it to a useful format and then uses that data to drive an integrated highly scalable simulation engine which may employ combinations of the system dynamics, discrete event and agent based paradigms within a simulation run such that the most useful and accurate data is obtained and stored for the needs of the analyst.

SUMMARY OF THE INVENTION

Accordingly, the inventor has developed a distributed system for accurate and detailed modeling of systems with large and complex datasets using a distributed simulation engine. The system further uses results of information analytics to optimize the making of decisions and allow for alternate action pathways to be simulated using the latest data and machine mediated prediction algorithms. Specifically, portions of the system are applied to the areas reliably predicting the outcomes of differential decision paths and prediction of risk to value for each set of decision choices through simulation of the progression of each decision pathway using the most current sensor data, specific programmed decision defining parameters and environment data available and then presenting that data in a format most useful to the authors of the simulation.

According to a preferred embodiment of the invention, a system for accurate and detailed modeling of systems with large and complex datasets using a distributed simulation engine comprising: a data retrieval engine stored in a memory of and operating on a processor of a computing device; a data analysis engine stored in a memory of and operating on a processor of a computing device; and an automated planning and value at risk estimation module stored in a memory of and operating on a processor of one of more computing devices. An action outcome simulation module stored in the memory of and operating on a processor of one or more computing devices, wherein, the information retrieval engine: retrieves a plurality of relevant data from a plurality of sources; accepts a plurality of analysis parameters and control commands directly from human interface devices or from one or more command and control storage devices, and stores accumulated retrieved information for processing by data analysis engine or predetermined data timeout. The information analysis engine retrieves a plurality of data types from the information retrieval engine, and performs a plurality of analytical functions and transformations on retrieved data based upon the specific goals and needs set forth in a current campaign by process analysis authors. The automated planning and value at risk estimation module: employs results of data analyses and transformations performed by the information analysis engine, together with available supplemental data from a plurality of sources as well as any current campaign specific machine learning, commands and parameters from process analysis authors to formulate current planning and risk status reports and employs results of data analyses and transformations performed by the information analysis engine, together with available supplemental data from a plurality of sources, any current campaign specific commands and parameters from process analysis authors, as well as input gleaned from machine learned algorithms to deliver decision pathway simulations and value at risk support to a first end user. The action outcome simulation module: retrieves at least a portion of the results of data analyses and transformations performed by the information analysis engine, retrieves at least one piece of raw data from the information retrieval engine, employs a plurality of parameters entered from the automated planning and value at risk estimation module, uses information obtained to execute predictive simulations of venture or decision progress pathway and outcome as originally initialized by simulation author using a simulation method that combines system dynamics method, discrete event method, or agent based method for at least one simulation instance, employs groupings of action profile data and configuration parameters to create computer based models of real-world items to act in the simulation.

According to another embodiment of the invention, a system for fully integrated collection of relevant data, analysis of that data and generation of both analysis-driven decisions and analysis-driven simulations of alternate candidate decision comprising: a data retrieval engine stored in a memory of and operating on a processor of a computing device, 2. The system of claim 1, wherein the information retrieval engine stored in the memory of and operating on a processor of a computing device, employs a portal for human interface device input at least a portion of which are relevant data and at least another portion of which are commands and parameters related to the conduct of a current venture campaign alternatives. Wherein the automated planning and value at risk estimation module uses at least information theory based statistical analysis to reliably predict future outcome of current decision based analyzed previous data. The automated planning and value at risk estimation module uses at least Monte Carlo heuristic model value at risk principles to reliably estimate future value at risk figures of current decision based analyzed previous data. The automated planning and value at risk estimation module uses a specifically designed graph-based data store service to efficiently store and manipulate the large data structures created during decision outcome analysis. The automated planning and value at risk estimation module has job control function that allows both jobs that run in a single iteration with a single set of parameters and jobs that include multiple iterations and sets of predetermined sets of parameters with termination criteria to stop execution when desired analysis results are obtained. Some jobs are run offline in a batch like mode and other jobs are run online in an interactive mode where users enter parameters for subsequent iterations based upon results of previous iterations until a predesigned analysis result terminates execution. At least one simulation includes models for hazards, vulnerabilities, contractual obligations and financial capital loss. The automated planning and value at risk estimation module acts upon at least one computer-based model to modify it prior to the simulation.

According to another embodiment of the invention, a system for fully integrated collection of relevant data, analysis of that data and generation of both analysis-driven decisions and analysis-driven simulations of alternate candidate decision comprising: An information retrieval engine stored in the memory of and operating on a processor of a computing device, employs a portal for human interface device input at least a portion of which are relevant data and at least another portion of which are commands and parameters related to the conduct of a current venture campaign alternatives. An automated planning and value at risk estimation module uses a least information theory-based statistical analysis to reliably predict future outcome of current decision based analyzed previous data. An automated planning and value at risk estimation module uses at least Monte Carlo heuristic model value at risk principles to reliably estimate future value at risk figures of current decision based analyzed previous data. An automated planning and value at risk estimation module uses a specifically designed graph-based data store service to efficiently store and manipulate the large data structures created during decision outcome analysis. An automated planning and value at risk estimation module has job control function that allows both jobs that run in a single iteration with a single set of parameters and jobs that include multiple iterations and sets of predetermined sets of parameters with termination criteria to stop execution when desired analysis results are obtained. Some jobs are run offline in a batch like mode and other jobs are run online in an interactive mode where users enter parameters for subsequent iterations based upon results of previous iterations until a predesigned analysis result terminates execution According to a preferred embodiment of the invention, a method for fully integrated collection of relevant data, analysis of that data and generation of both analysis-driven decisions and analysis-driven simulations of alternate candidate decision comprising the steps of: a) receiving decision parameters and objectives using a client access interface stored in a memory of and operating on a processor of a computing device; b) retrieving a plurality of data from a plurality of sources using a data retrieval engine stored in a memory of and operating on a processor of a computing device; c) creating simulation models of real-world objects from available data using an action outcome simulation module stored in a memory of and operating on a processor of one of more computing devices; d) predicting the outcome of predetermined decision or venture candidates and estimating the value at risk attached to each candidate by simulation of the outplay of the decision or venture using the action outcome simulation module.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

Figure 5:
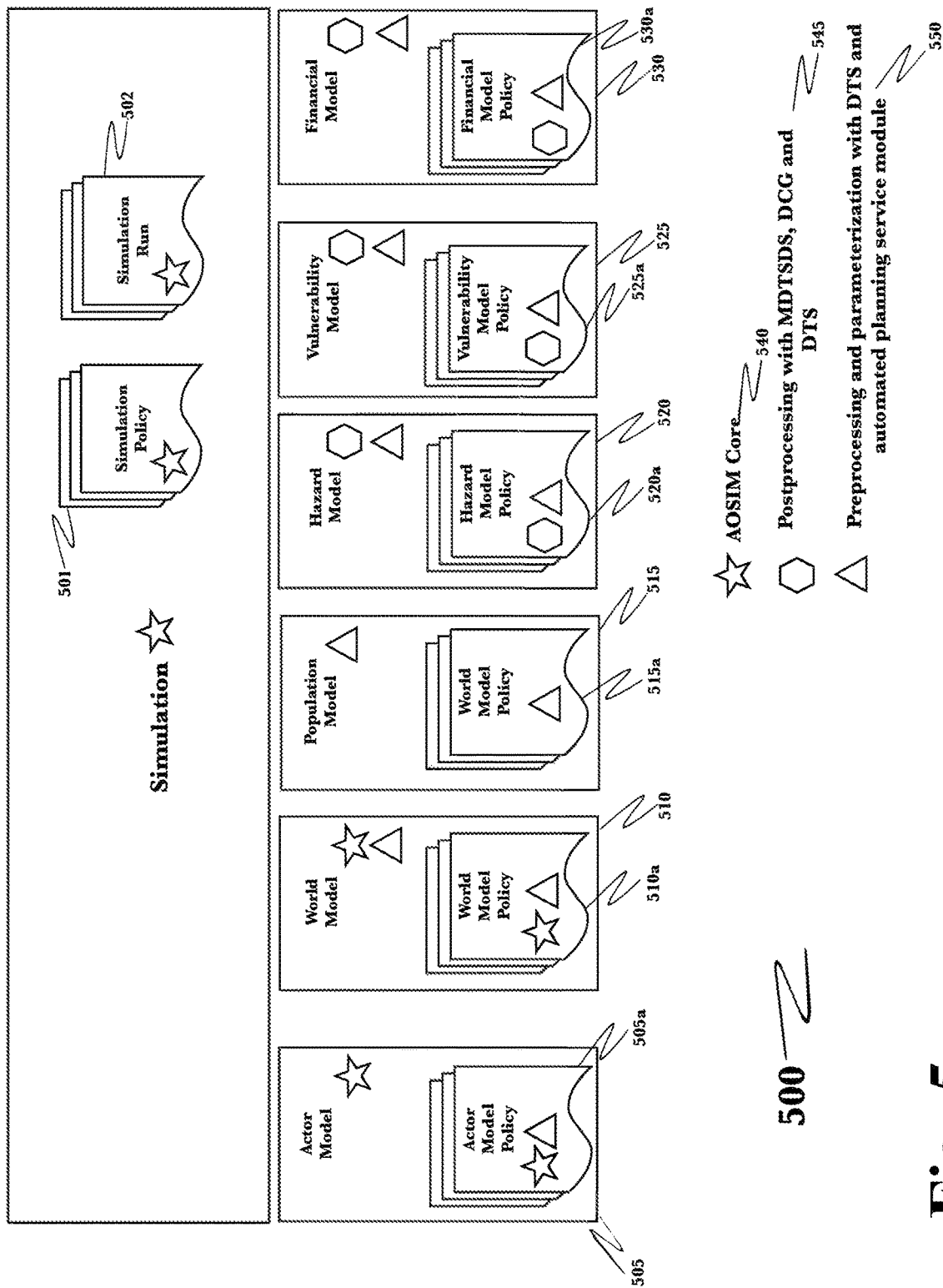

FIG. 5. is a diagram depicting the primary processing locations of individual components of an action outcome simulation module simulation.

Figure 6:
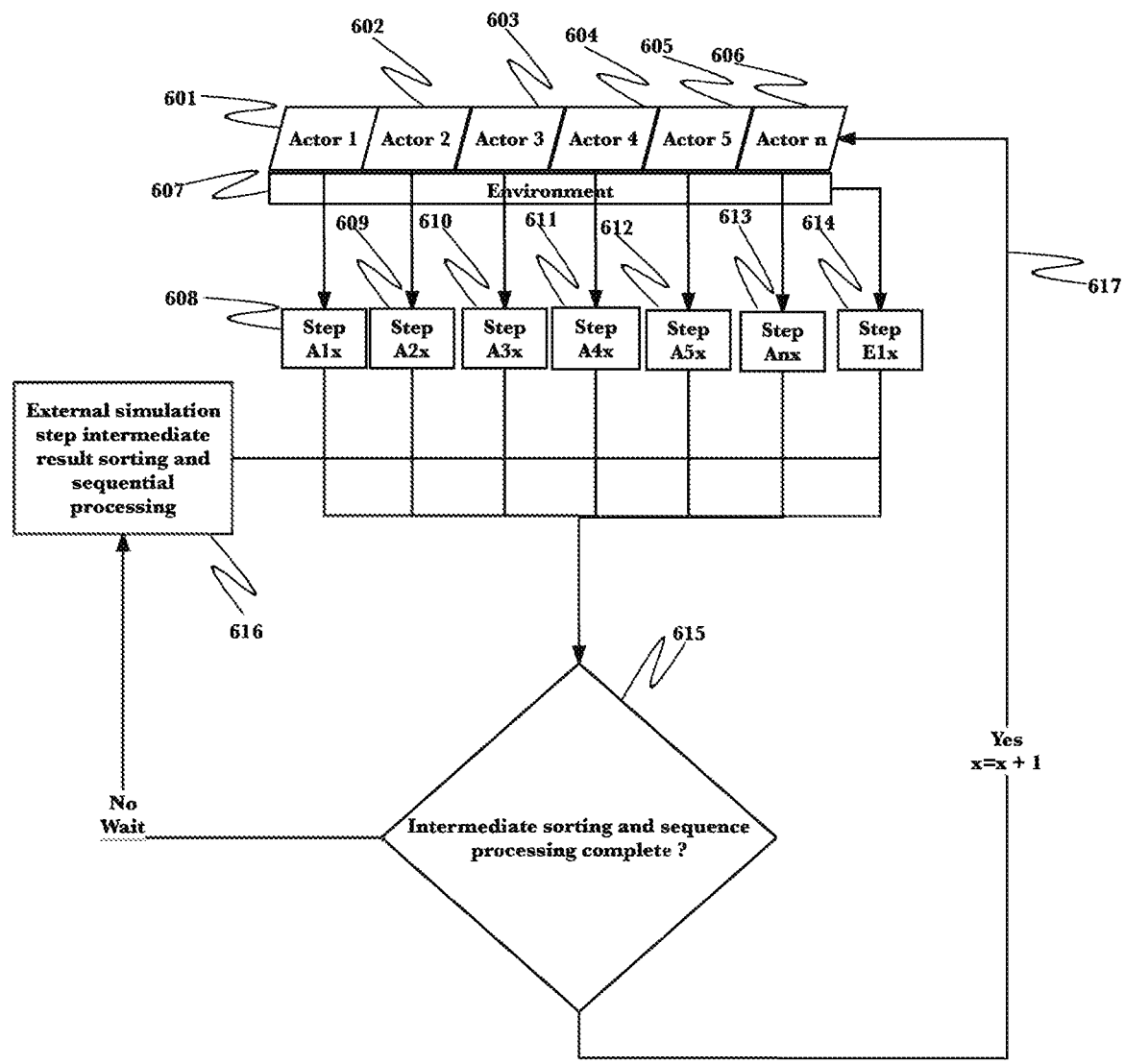

FIG. 6 is a flow chart diagram illustrating centralized event queue timing according to an embodiment of the invention.

Figure 7:
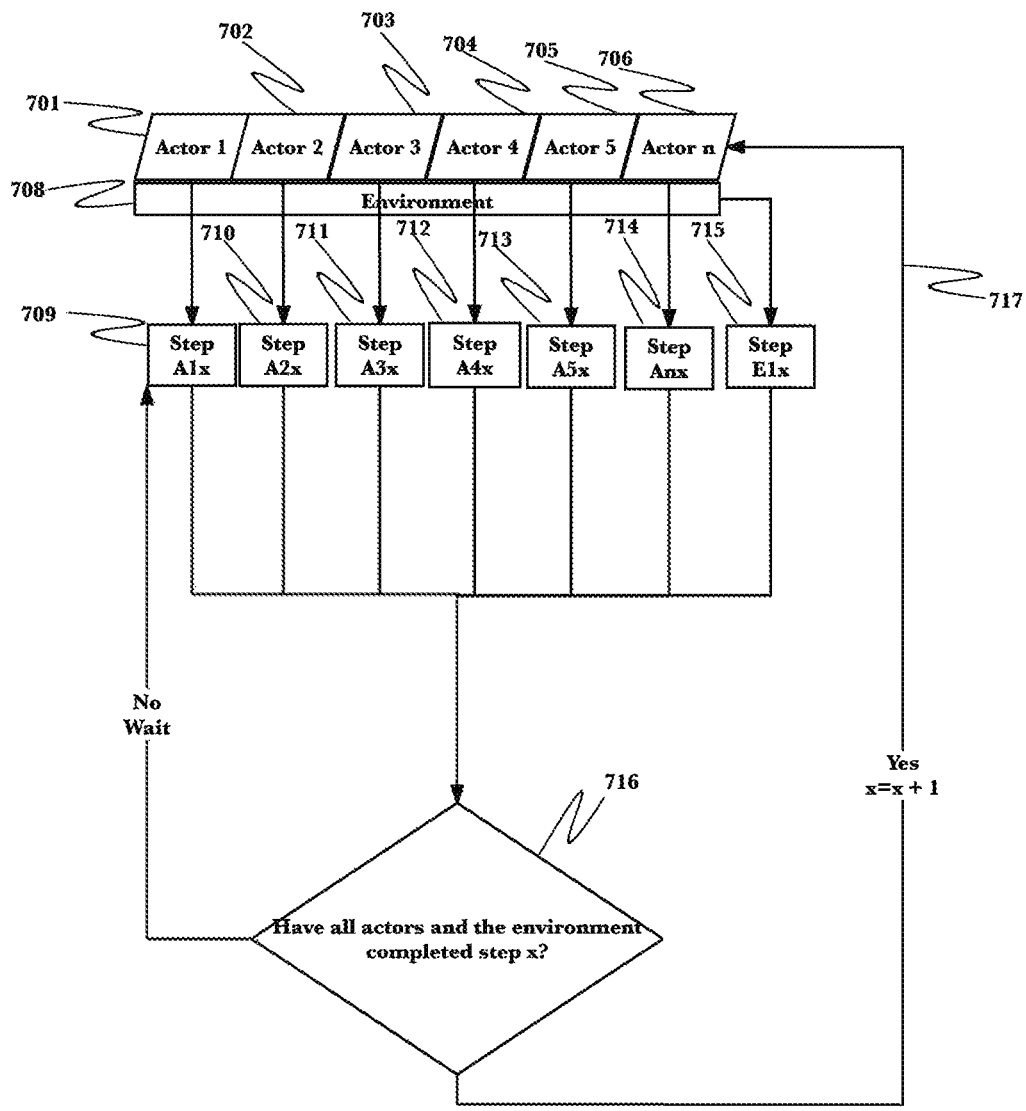

FIG. 7 is a flow chart diagram illustrating time stepped queue timing according to an embodiment of the invention.

Figure 8:
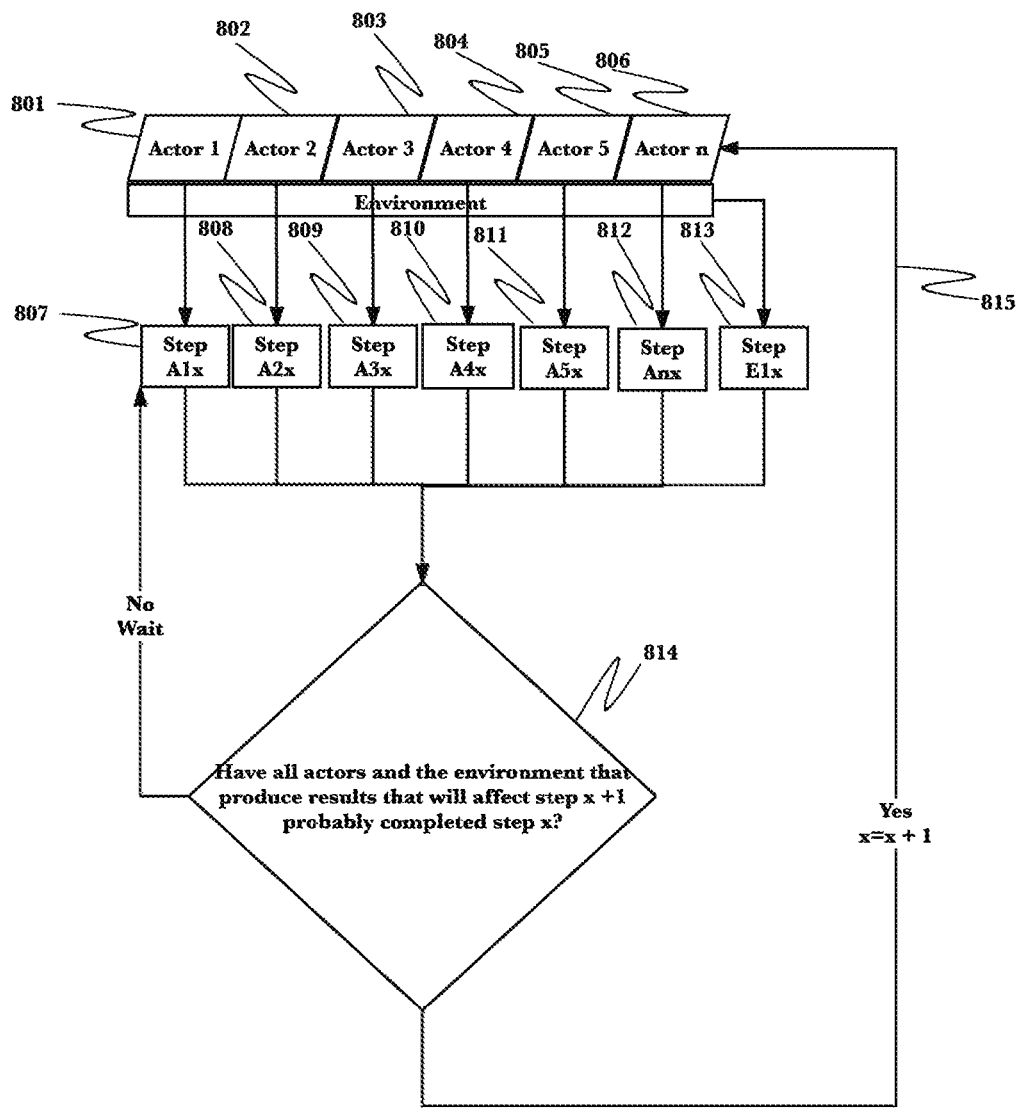

FIG. 8 is a flow chart diagram illustrating conservative event-driven queue timing according to an embodiment of the invention.

Figure 9:
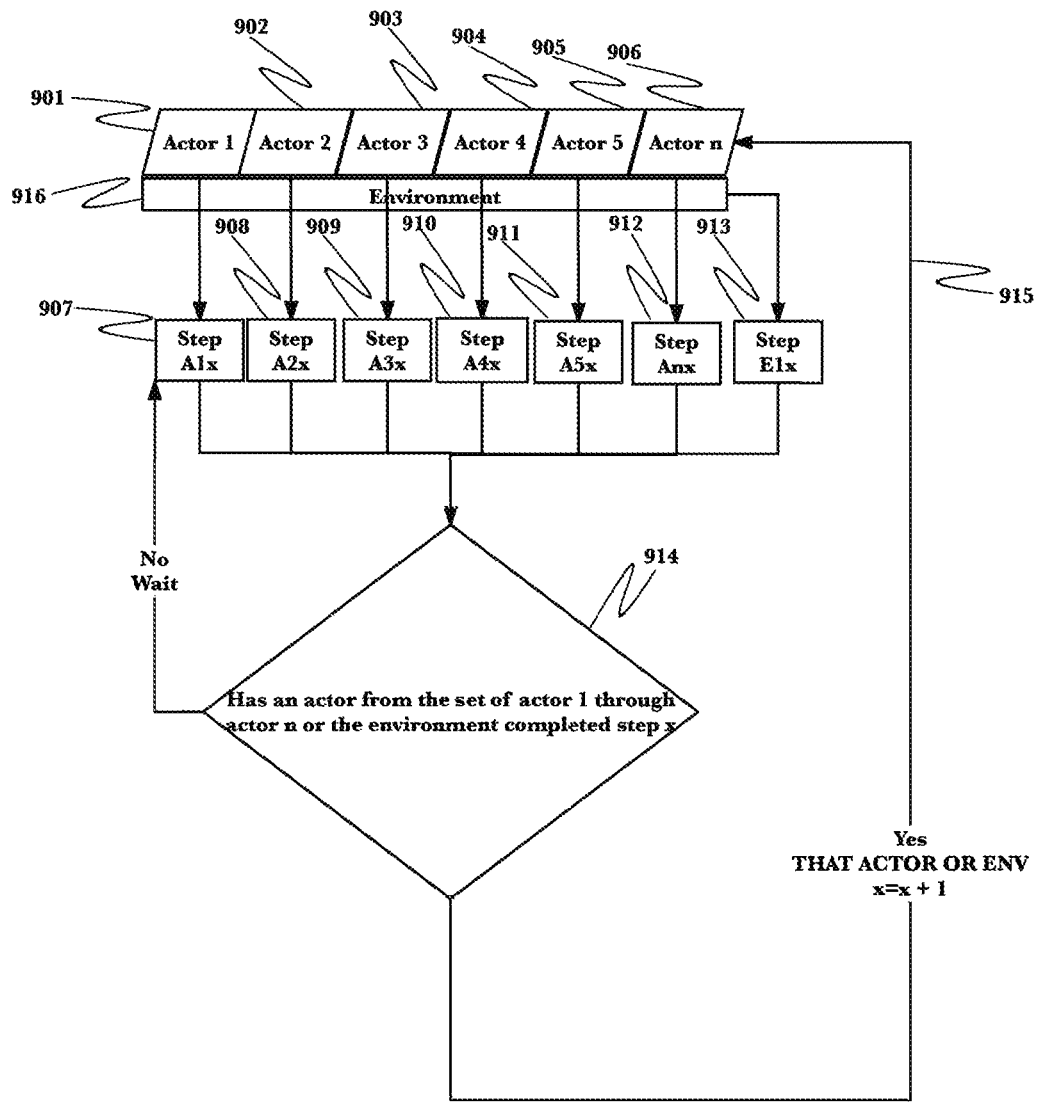

FIG. 9 is a flow chart diagram illustrating optimistic event-driven queue timing according to an embodiment of the invention.

Figure 10:
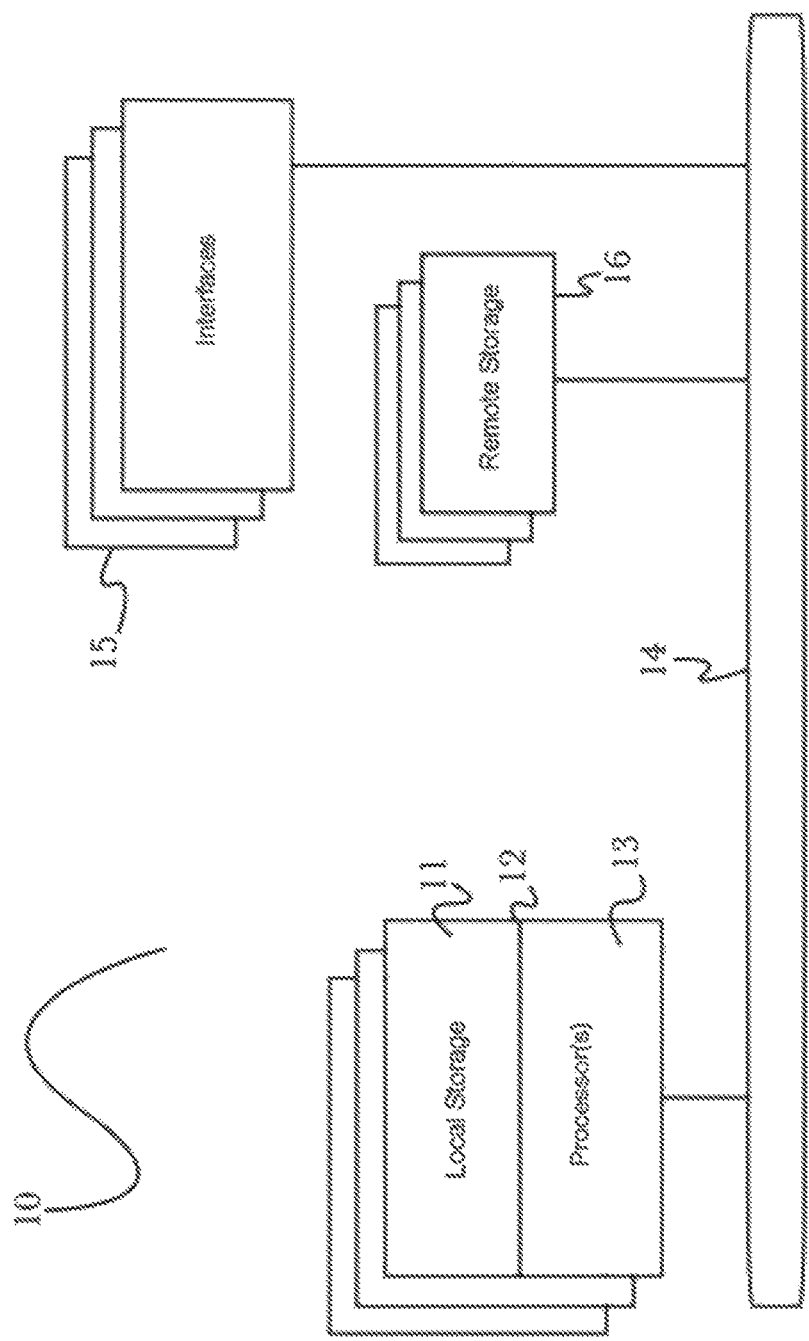

FIG. 10 is a block diagram illustrating an exemplary hardware architecture of a computing device used in various embodiments of the invention.

Figure 11:
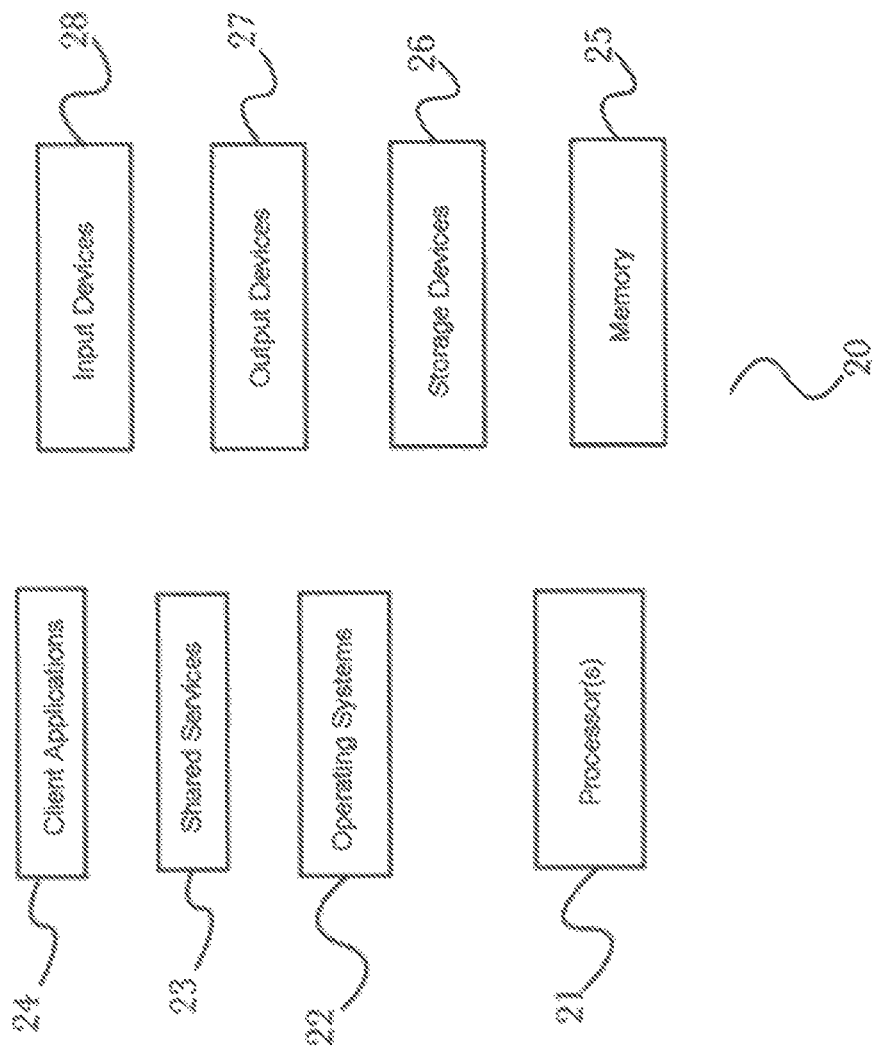

FIG. 11 is a block diagram illustrating an exemplary logical architecture for a client device, according to various embodiments of the invention.

Figure 12:
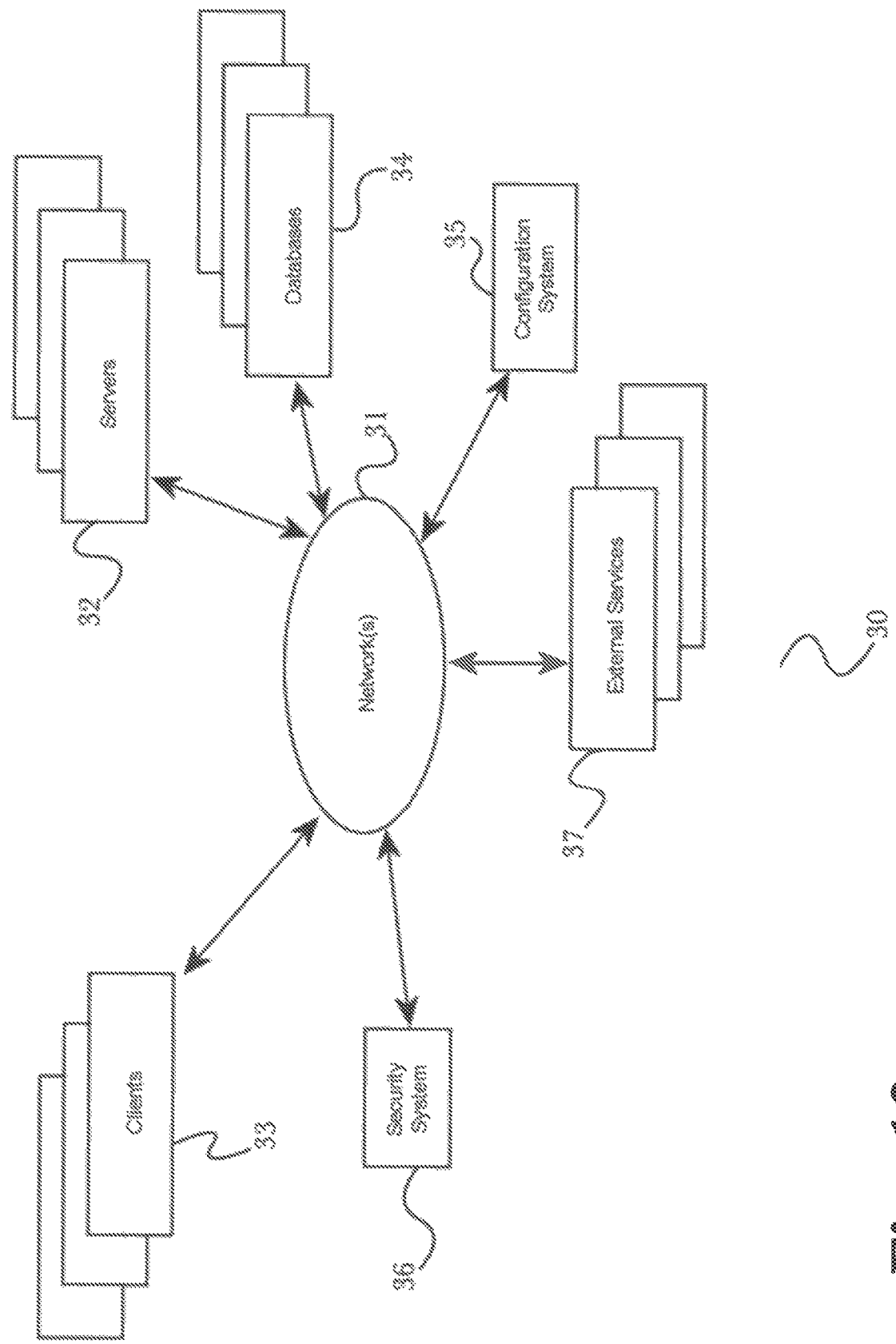

FIG. 12 is a block diagram illustrating an exemplary architectural arrangement of clients, servers, and external services, according to various embodiments of the invention.

Figure 13:
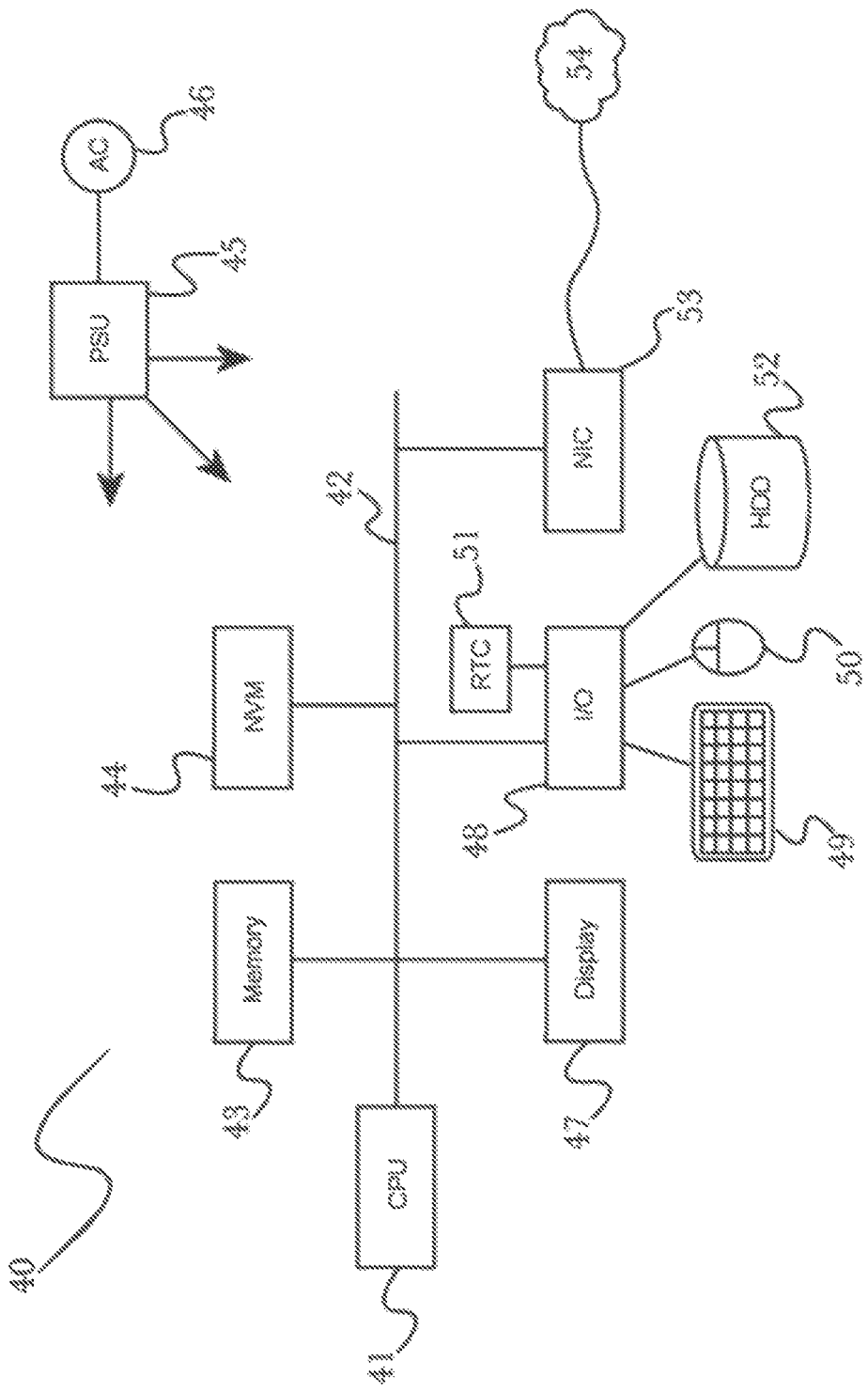

FIG. 13 is another block diagram illustrating an exemplary hardware architecture of a computing device used in various embodiments of the invention

DETAILED DESCRIPTION OF THE INVENTION

The inventor has conceived, and reduced to practice, a system for accurate and detailed modeling of systems with large and complex datasets using a distributed simulation engine.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein, a "swimlane" is a communication channel between a time series sensor data reception and apportioning device and a data store meant to hold the apportioned data time series sensor data. A swimlane is able to move a specific, finite amount of data between the two devices. For example, a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane can transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

Conceptual Architecture

Figure 1:
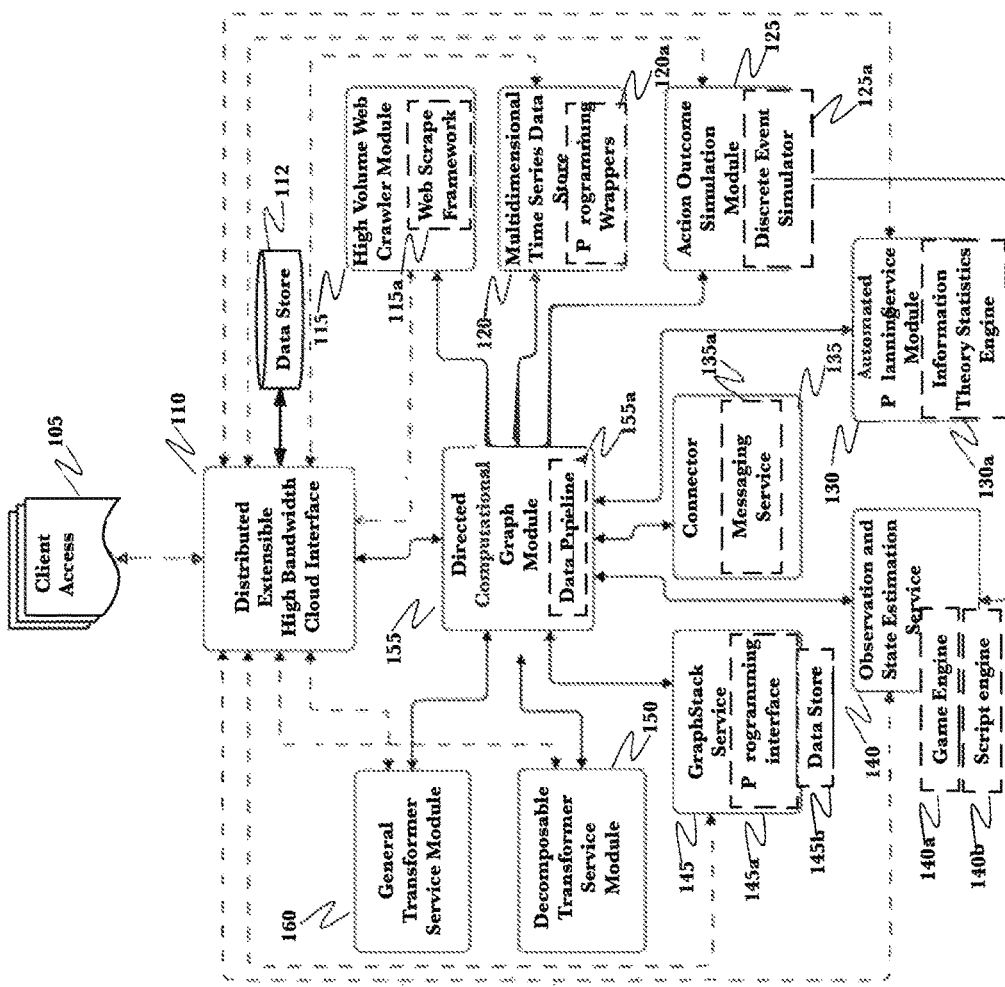
FIG. 1 is a diagram of an exemplary architecture of an organizational operating system according to an embodiment of the invention.

FIG. 1 is a diagram of an exemplary architecture of a organizational operating system 100 according to an embodiment of the invention. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the data analyzed by the system both from sources within the confines of the client organization, and from cloud based sources, also enter the system through the cloud interface 110, data being passed to the analysis and transformation components of the system, the directed computational graph module 155, high volume web crawler module 115, multi-dimensional time series database 120 and the graph stack service. The directed computational graph module 155 retrieves one or more streams of data from a plurality of sources, which includes, but is in no way not limited to, a plurality of physical sensors, web based questionnaires and surveys, monitoring of electronic infrastructure, crowd sourcing campaigns, and human input device information. Within the directed computational graph module 155, data may be split into two identical streams in a specialized pre-programmed data pipeline 155a, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115a of which SCRAPY™ is an example, to identify and retrieve data of interest from web based sources that are not well tagged by conventional web crawling technology. The multiple dimension time series database module 120 receives data from a large plurality of sensors that may be of several different types. The module is designed to accommodate irregular and high volume surges by dynamically allotting network bandwidth and server processing channels to process the incoming data. Inclusion of programming wrappers for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145a, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145a and stores it in a graph-based data store 145b such as GIRAPH™ or a key value pair type data store REDIS™, or RIAK™, among others, all of which are suitable for storing graph-based information.

Results of the transformative analysis process may then be combined with further client directives, additional rules and practices relevant to the analysis and situational information external to the already available data in the automated planning service module 130 which also runs powerful information theory 130a based predictive statistics functions and machine learning algorithms to allow future trends and outcomes to be rapidly forecast based upon the current system derived results and choosing each of a plurality of possible decisions. The using all available data, the automated planning service module 130 may propose decisions most likely to result is the most favorable outcome with a usably high level of certainty. Closely related to the automated planning service module in the use of system derived results in conjunction with possible externally supplied additional information in the assistance of end user decision making, the action outcome simulation module 125 with its discrete event simulator programming module 125a coupled with the end user facing observation and state estimation service 140 which is highly scriptable 140b as circumstances require and has a game engine 140a to more realistically stage possible outcomes of decisions under consideration, allows decision makers to investigate the probable outcomes of choosing one pending course of action over another based upon analysis of the current available data. For example, the pipelines operations department has reported a very small reduction in crude oil pressure in a section of pipeline in a highly remote section of territory. Many believe the issue is entirely due to a fouled, possibly failing flow sensor, others believe that it is a proximal upstream pump that may have foreign material stuck in it. Correction of both of these possibilities is to increase the output of the effected pump to hopefully clean out it or the fouled sensor. A failing sensor will have to be replaced at the next maintenance cycle. A few, however, feel that the pressure drop is due to a break in the pipeline, probably small at this point, but even so, crude oil is leaking and the remedy for the fouled sensor or pump option could make the leak much worse and waste much time afterwards. The company does have a contractor about 8 hours away, or could rent satellite time to look but both of those are expensive for a probable sensor issue, significantly less than cleaning up an oil spill though and then with significant negative public exposure. These sensor issues have happened before and the organizational operating system 100 has data from them, which no one really studied due to the great volume of columnar figures, so the alternative courses 125, 140 of action are run. The system, based on all available data, predicts that the fouled sensor or pump is unlikely to be the root cause this time due to other available data, and the contractor is dispatched. She finds a small breach in the pipeline. There will be a small cleanup and the pipeline needs to be shut down for repair but multiple tens of millions of dollars have been saved. This is just one example of a great many of the possible use of the organizational operating system, those knowledgeable in the art will easily formulate more.

Figure 2:
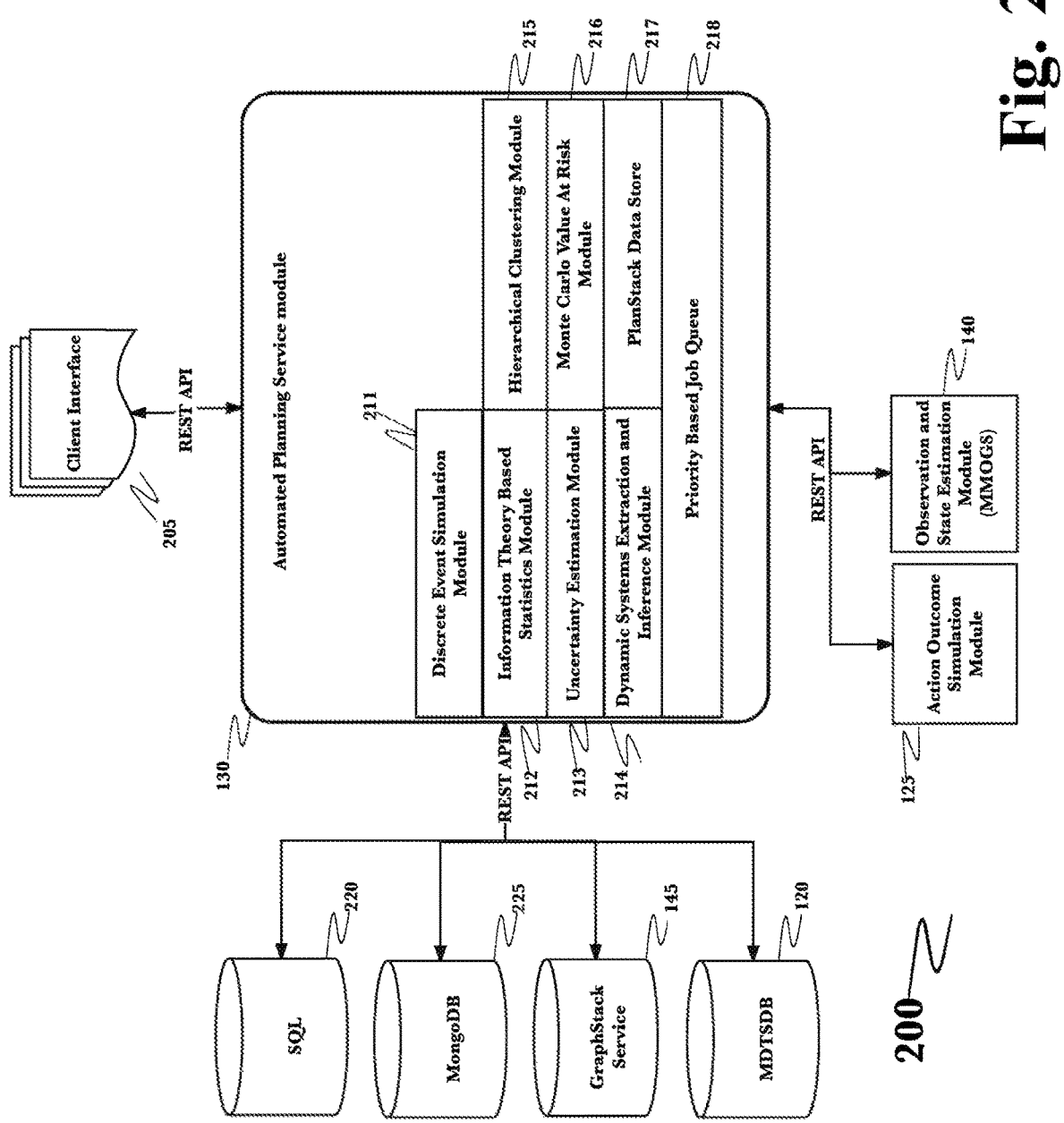
FIG. 2 is a diagram of an exemplary architecture of an automated planning service cluster and related modules according to an embodiment of the invention.

FIG. 2 is a diagram of an exemplary architecture of an automated planning service module and related modules according to an embodiment of the invention. Seen here is a more detailed view of the automated planning service module 130 as depicted in FIG. 1. The module functions by receiving decision or venture candidates as well as relevant currently available related data and any campaign analysis modification commands through a client interface 205. The module may also be used provide transformed data or run parameters to the action outcome simulation module 125 to seed a simulation prior to run or to transform intermediate result data isolated from one or more actors operating in the action outcome simulation module 125, 320, 320b, 320d, 320f during a simulation run. Significant amounts of supporting information such as, but not restricted to current conditions, infrastructure, ongoing venture status, financial status, market conditions, and world events which may impact the current decision or venture that have been collected by the organizational operating system as a whole and stored in such data stores as the multidimensional times series database 120, the analysis capabilities of the directed computational graph module 155 and web-based data retrieval abilities of the high volume web crawler module 115 all of which may be stored in one or more data stores 220, 225 may also be used during simulation of alternative decision progression, which may entail such variables as, but are not limited to implementation timing, method to end changes, order and timing of constituent part completion or impact of choosing another goal instead of an action currently under analysis.

Contemplated actions may be broken up into a plurality of constituent events that either act towards the fulfillment of the venture under analysis or represent the absence of each event by the discrete event simulation module 211 which then makes each of those events available for information theory based statistical analysis 212, which allows the current decision events to be analyzed in light of similar events under conditions of varying dis-similarity using machine learned criteria obtained from that previous data; results of this analysis in addition to other factors may be analyzed by an uncertainty estimation module 213 to further tune the level of confidence to be included with the finished analysis. Confidence level would be a weighted calculation of the random variable distribution given to each event analyzed. Prediction of the effects of at least a portion of the events involved with a venture under analysis within a system as complex as anything from the microenvironment in which the client organization operates to more expansive arenas as the regional economy or further, from the perspective of success of the client organization is calculated in dynamic systems extraction and inference module 214, which use, among other tools algorithms based upon Shannon entropy, Hartley entropy and mutual information dependence theory.

Of great importance in any decision or new venture is the amount of value that is being placed at risk by choosing one decision over another. Often this value is monetary, but it can also be competitive placement, operational efficiency or customer relationship based, for example: the may be the effects of keeping an older, possibly somewhat malfunctioning customer relationship management system one more quarter instead of replacing it for $14 million dollars and a subscription fee. The automated planning service module has the ability predict the outcome of such decisions per value that will be placed at risk using programming based upon the Monte Carlo heuristic model 216 which allows a single "state" estimation of value at risk. It is very difficult to anticipate the amount of computing power that will be needed to complete one or more of these decision analyses which can vary greatly in individual needs and often are run with several alternatives concurrently. The invention is therefore designed to run on expandable clusters 215, in a distributed, modular, and extensible approach, such as, but not exclusively, offerings of Amazon's AWS. Similarly, these analysis jobs may run for many hours to completion and many clients may be anticipating long waits for simple "what if" options which will not affect their operations in the near term while other clients may have come upon a pressing decision situation where they need alternatives as soon as possible. This is accommodated by the presence of a job queue that allows analysis jobs to be implemented at one of multiple priority levels from low to urgent. In case of a change in more hypothetical analysis jobs to more pressing, job priorities can also be changed during run without loss of progress using the priority-based job queue 218.

Structured plan analysis result data may be stored in either a general purpose automated planning engine executing Action Notation Modeling Language (ANML) scripts for modeling which can be used to prioritize both human and machine-oriented tasks to maximize reward functions over finite time horizons 217 or through the graph-based data store 145, depending on the specifics of the analysis in complexity and time run.

Figure 3:
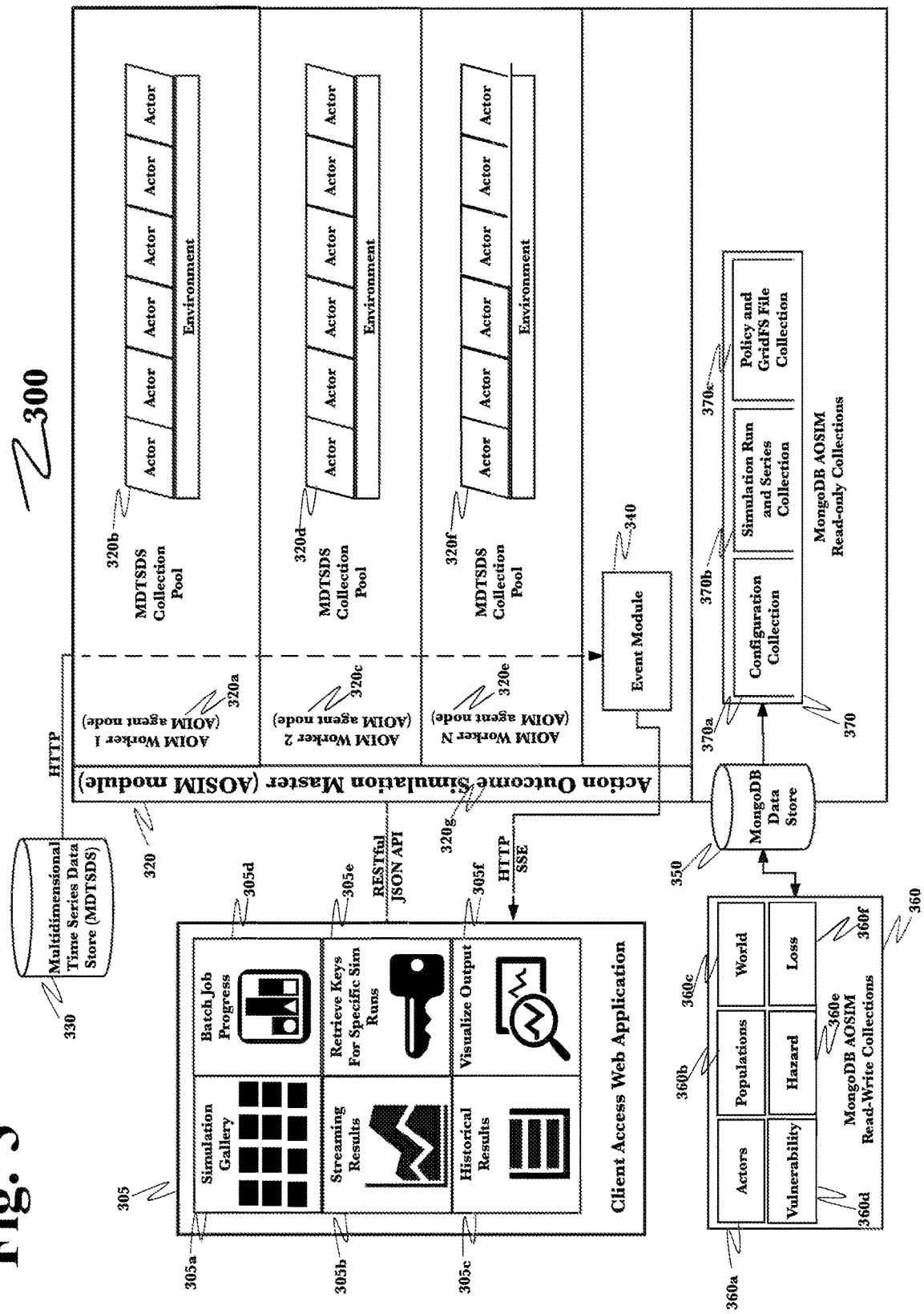
FIG. 3 is a diagram of an exemplary architecture of an action outcome simulation module and related modules according to an embodiment of the invention.

The results of analyses may be sent to one of two client facing presentation modules, the action outcome simulation module 125 or the more visual simulation capable observation and state estimation module 140 depending on the needs and intended usage of the data by the client FIG. 3 is a diagram of an exemplary architecture of an action outcome simulation module and related modules according to an embodiment of the invention 300. Set up and control for each simulation is specified through the client access web application 105 control screens programmed into the organizational operating system 305. These screens may include such options of choosing a simulation framework from a set of predefined simulation types 305*a* and eventually starting a novel simulation; inspecting progress of the multiple batch jobs that may represent the activities of actors, represent specific events and control the base environment, among other tasks of a simulation known to those skilled in the art 305*d*; streaming intermediary result data that is being collected during simulation progress 305*b*, obtaining the digital encryption keys for one or more simulation runs such that programmatic changes may be made to one or more static assumption parameters or to an algorithm that handles incoming model data among other examples known to those skilled in the art to improve the fidelity or usefulness of an upcoming planned run 305*e*; peruse and review results obtained and stored from past simulation runs 305*c* on a plurality of prospective plans including, if included in the set up such parameters as: risk prediction, capital losses incurred, capital benefits obtained, closeness of end result to planning stage expectations, most influential variables in outcome, and assumptions used among a large plurality of other possibilities. The interface also allows comparison of result parameters from multiple related simulated experiments where starting values and assumptions of interest were changed to predict the influence of each 305*c*.

The ability to run multiple related simulations in greatly shorter time than reality testing, which is an advantage of simulation in general and the ability to set up the simulation using, in large part graphical interface means and then have other modules of the integrated system largely handle pulling in great amounts of current, highly relevant data and transformed supporting results for each simulation run is a significant advantage of the invention. Last, the client access web application 105, 205, 305 offers a plurality of formats for presentation of the data 305*f* which may range from graphic-video or graphic-pictorial, to purely mathematical-numerical, as desired and appropriate to the simulation and intended use of the data at a given time point.

Simulations are carried out by the action outcome simulation module (AOSIM) 320, which includes a highly extensible, distributed structure illustrated in the embodiment by the AOSIM agent nodes: AOSIM worker 1 320*a*, AOSIM worker 2 320*c*, to AOSIM worker N 320*e*, the number of node expected to vary with the scale and complexity of the simulation being run, all under the programmatic control of the action outcome simulation master node which controls the introduction of data into the individual model actor substructures 320*b*, 320*d*, 320*f* and the timing of each simulations step run which may be changed to suit the level of inter-reliance of model actors within the simulation and the required accuracy level of the simulation versus time to run 600, 700, 800, 900 which may range from the requirement that intermediate data be transformed, possibly using the automated planning service module 130, 200. Processed data may then be entered manually back into the sequence 600, to a timing scenario where each actor steps through the simulation independently of all other actors, disregarding any possible inter-actor data dependency effects 900. Within each grouping of models or actors 320*b*, 320*d*, 320*f*, which due to the distributive capabilities of the AOSIM module may operate as a single group, adjacent actors may model different participants in the real-world system being simulated. So, as a simple, non-exclusive example, if simulating a city street corner, the first actor in group 320*b* may model a distracted pedestrian in a hurry to get to work while the second actor may model a moving car making a left hand turn and the third actor a basketball approaching the same intersection. Other actors may model such conditions fog or potholes that more passively act upon the other actors to some varying extent. Beneath this entire actor structure is the environment level which monitors the working of each actor, collects and may transfer results to the master 320*g* for transformation and storage. The environment layer may also pass control directives to one or more of the actors at a given instance, one of which may be timing commands. Factors that may significantly affect the outcome reliability of a simulation such as but not limited to inherent variability within collected data, measurement inaccuracies, exogenous factors not envisioned in simulation setup, and discrepancies between computational parameter data and data from real world simulation analogs are ameliorated through the use of large sample sets of pertinent real world measurements collected from multiple available sources and stored by the system embodiment 330 for subsequent simulation guidance use, use of inferential information theory based statistics, and the use of heuristic modeling as described previously, among other techniques known to those skilled in the art to reduce uncertainty in such settings.

Base configuration data 370*a* simulation run and series parameters 370*b* and policy as well as MongoDB GridFS encoded support document files for use in simulation setup and initiation 370*c* all of which are crucial to the general function of AOSIM are stored in a read-only MongoDB store 370 and can be changed only by AOSIM APIs directly through the MongoDB data store 350 to protect their integrity but are used read-only by the client access web application to retrieve parameters during initial simulation set-up and initialization. During run of the simulation, the potentially vast amount of intermediate information generated are also stored in a MongoDB data store 350 collection 360 where the data is sorted by the system into actor related 360a, populations of actor related 360b, world 360c, projected vulnerability of simulation steps to negative effects on the overall outcome 360d, projected hazards 360e determined during simulation run and any actual projected loss incurred by the simulated venture pathway 360f. All of these data, in their finished state are included as part of the simulation result presentation 305f.

FIG. 6 is a flow chart diagram illustrating centralized event queue timing according to an embodiment of the invention 600. There are instances where the system being simulated is extremely complex or where even with the abilities of the AOSIM 300 to perform automated processing of data from categories such as but not limited to: physical world, cyber-physical interactions, socio-technical, information network interactions, persona integration and cognitive reasoning, at least some of the intermediate result data must be inspected and may be manipulated, possibly by another module of the organizational operating system 100, perhaps such as the automated planning service module 130, the directed computational graph module 155 or in at least one case, manually for a particular simulation step, before re-introduction into the simulation 616. Other times the sequence of when each actor 601, 602, 603, 604, 605, 606, 607 runs a next step 608, 609, 610, 611, 612, 613, 614 in the simulation may need to be modified based on the previous step 616. Under such conditions, it is important that all data manipulation and sequence processing are completed 615 prior to the next step being initiated 617.

FIG. 7 is a flow chart diagram illustrating time stepped queue timing according to an embodiment of the invention 700. There are instances where the system being simulated includes actors that are highly interdependent and almost certainly rely on the outcome of one or more other actors at multiple steps to result in reliable simulation results. Under these conditions, it is critical that all actors 701, 702, 703, 704, 705, 706, 708 complete each step 709, 710, 711, 712, 713, 714, 715 (x) 716 before any of the actors begin the next step (x+1) 717.

FIG. 8 is a flow chart diagram illustrating conservative event-driven queue timing according to an embodiment of the invention 800. There are instances where the system being simulated includes actors that are somewhat interdependent and may rely on the outcome of one or more actors at one or more steps to result in reliable simulation results. Under these conditions, it is important that actors 801, 802, 803, 804, 805, 806 complete steps where interdependency exists 807, 808, 809, 810, 811, 812, 813, (step x) 814 before the actors begin the next step (x+1) 815 and therefore when this timing scheme is used, individual actors will only perform the next step 815 when the embodiment determines interdependency at the step in question is extremely unlikely 814.

FIG. 9 is a flow chart diagram illustrating optimistic event-driven queue timing according to an embodiment of the invention 900. There are instances where the system being simulated does not include any interdependent actors that rely on the outcome of one or more actors at one or more steps to result in reliable simulation results or where time constraints and the effects of missing update such interdependent data are such that running the simulation as quickly as possible is desired. Under these conditions, each actor 901, 902, 903, 904, 905, 906, 916 complete steps 907, 908, 909, 910, 911, 912, 913, (x) independently without regard to whether interdependency exists 914 before the actors begin the next step (x+1) 915 and therefore when this timing scheme is used, individual actors each 915 as rapidly as possible 914.

There is no reason that the invention could not employ multiple timing schemes during a single simulation as each scheme becomes appropriate. This may optimize the speed at which simulations complete while ensuring that all interdependent actor data states within the simulation are honored and the reliable completion of any simulation occurs.

Figure 4:
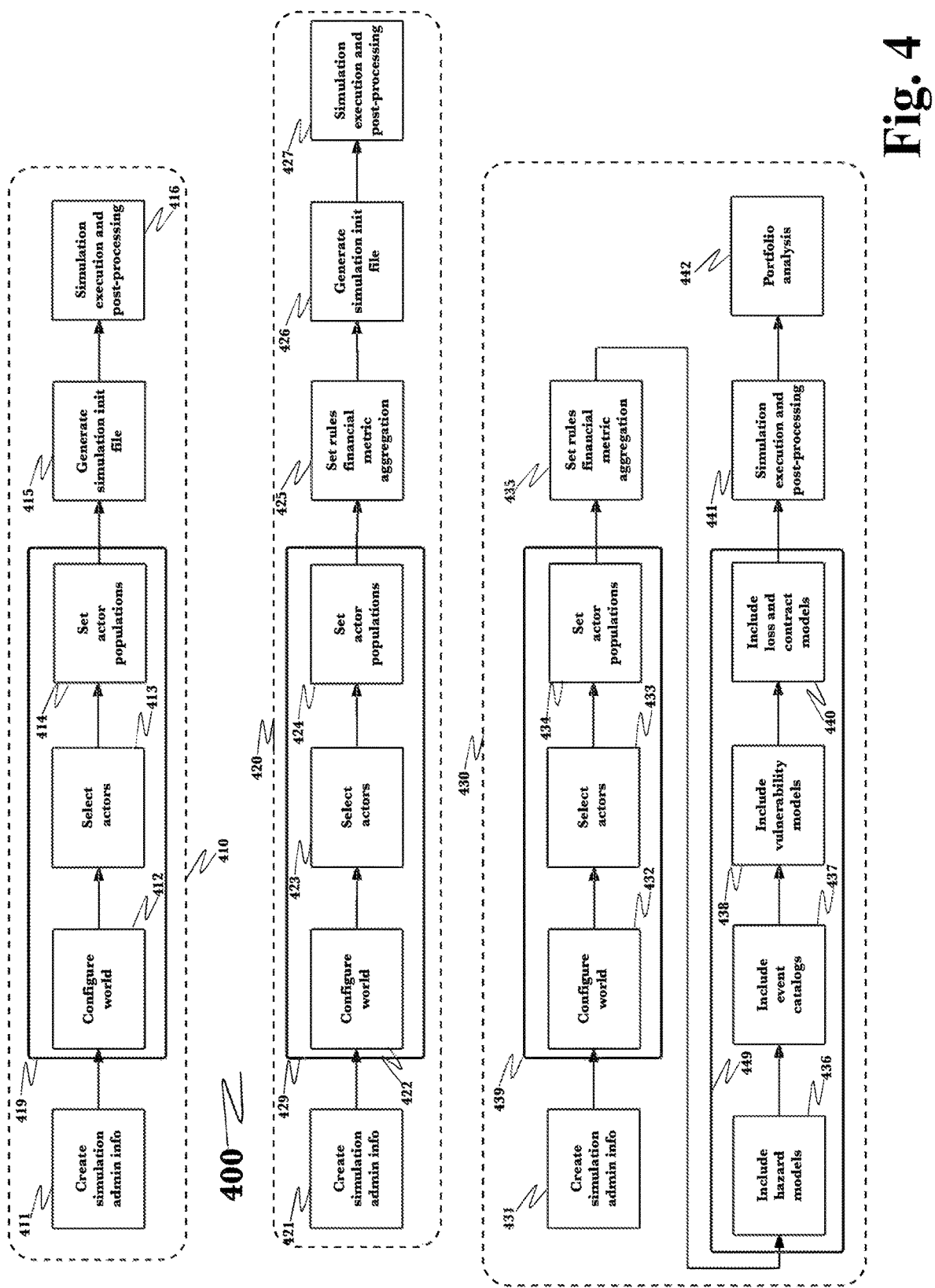
FIG. 4 is flow diagram illustrations of setup and execution of three types of action outcome simulation module simulation runs according to an embodiment of the invention.

FIG. 4 is flow diagram illustrations of setup and execution of three types of action outcome simulation module simulation runs according to an embodiment of the invention 400. The top panel 410, depicts the simple simulation which may be used to explore the myriad of "what if" ideas that may arise during the operation of an organization or where there is little or no foreseen capital and market risk involved. As may be expected, the set-up phase of the simulation consumes the large majority of the steps as once simulation execution is initiated, the author must then only wait for and then interpret, possibly further manipulate the results 416. The process starts with the creation of administrative information 411, here such parameters as boundaries of data values to be used, the data store database origin or origins of data to be used, if more than one source exists, organizational operating system resource levels to be used, timing scheme to be used, progress indicators to be displayed and desired mode of display of the completed simulation may be just a few examples of a much larger set of administrative parameters known to those skilled in the art which may be specified. For any simulation, a reliably useful end result integrally depends on the proper configuration of the factors that will affect the actors of the simulation, forming the milieu in which they will perform their programmed actions, here designated the "world" 412. That the constraints and influences exercised by the configured factors of the world match those of the real-world under expected conditions of the simulation must be certain. Of equal importance is the proper configuration of the actors 413 modeling the real world items within the simulation, again, reliable data concerning the behavior of each actor type and variants within actor types must closely match those of the real-world items under programmed simulation conditions. It is also important to carefully consider the selection of actor types and numbers of each type to be included in a simulation as this factor may change the outcome considerably and lead to conclusions contrary to reality if real-world proportions are far afield of those in the computer simulation. It is sometimes useful to place individual instances of a particular model (actor) type into one or more groups to measure not only how each individual behaves in the simulation but the overall results obtained from the group. The embodiment allows this by supporting actor populations to be specified 414. Successful completion of a real-world reliable simulation may be greatly augmented by the ability to compare the results of a partial simulation run with as much of the limited real-world data as is available or possibly even incorporating portions of that real-world data into the constituent parts of the simulation such as the world configuration 412, selection of actor model characteristics 413 and types and the generation of appropriate actor populations 414. The organizational operating system offers a mechanism for use of this potential advantage by allowing the simulation constituents listed to be attached as run parameters to the automated planning service module, bringing the inferential statistic and Monte Carlo heuristic algorithms into support in directing the intelligent inclusion and use of data from other modules of the organizational operating system for improvement of the course taken by the simulation when run to completion 419. At the end of the multiple, highly important configuration steps, simulation initialization file containing all of the parameters, module tie-in references and administrative run directives may be created 415. This defines the simulation to be run in format readable by the action outcome simulation module. The simulation is then run, any post processing completed and the results displayed, possibly motion graphically through use of the observation state estimation service 140 with its game engine 140a and presentation manipulation scripting capabilities 140b, or possibly presented in some other format per the pre-design of authors of the simulation.

The middle panel 420, depicts a simulation with financial aggregation which may be used to explore decisions or ventures where the loss or gain of capital is possible. Capital, as an actor behaves the same, so creating multiple instantiations of it in a simulation is a waste of time and potentially computing resources. Capital is therefore treated as an aggregate much as the actors in a system dynamics-based simulation where all actors are aggregate agents of their real-world counterpart. As may be expected, the set-up phase of the simulation consumes the large majority of the steps as once simulation execution is initiated, the author must then only wait for and then interpret, possibly further manipulate the results 427. The process starts with the creation of administrative information 421, here such parameters as boundaries of data values to be used, the data store database origin or origins of data to be used, if more than one source exists, organizational operating system resource levels to be used, timing scheme to be used, progress indicators to be displayed and desired mode of display of the completed simulation may be just a few examples of a much larger set of administrative parameters known to those skilled in the art which may be specified. For any simulation, a reliably useful end result integrally depends on the proper configuration of the factors that will affect the actors of the simulation, forming the milieu in which they will perform their programmed actions, here designated the "world" 422. That the constraints and influences exercised by the configured factors of the world match those of the real-world under expected conditions of the simulation must be certain. Of equal importance is the proper configuration of the actors 423 modeling the real-world items within the simulation, again, reliable data concerning the behavior of each actor type and variants within actor types must closely match those of the real-world items under programmed simulation conditions. It is also important to carefully consider the selection of actor types and numbers of each type to be included in a simulation as this factor may change the outcome considerably and lead to conclusions contrary to reality if real-world proportions are far afield of those in the computer simulation. It is sometimes useful to place individual instances of a particular model (actor) type into one or more groups to measure not only how each individual behaves in the simulation but the overall results obtained from the group. The embodiment allows this by supporting actor populations to be specified 424. Successful completion of a real-world reliable simulation may be greatly augmented by the ability to compare the results of a partial simulation run with as much of the limited real-world data as is available or possibly even incorporating portions of that real-world data into the constituent parts of the simulation such as the world configuration 422, selection of actor model characteristics 423 and types and the generation of appropriate actor populations 424. The organizational operating system offers a mechanism for use of this potential advantage by allowing the simulation constituents listed to be attached as run parameters to the automated planning service module, bringing the inferential statistic and Monte Carlo heuristic algorithms into support in directing the intelligent inclusion and use of data from other modules of the organizational operating system for improvement of the course taken by the simulation when run to completion 429. Unlike the simple simulation described directly above 410, the rules and boundaries for the handling and reporting of capital flow within the simulation must be specified before the simulation is run 425. This may include items such as but not limited to total capital budget, how much capital loss can be tolerated in a single or specified number of simulation steps, whether profit should be placed higher than other considerations in some or all sets of the simulation, whether capital can be traded for brand recognition or confidence and many more potential choices that may be known to one skilled in the field. At the end of the multiple, highly important configuration steps, simulation initialization file containing all of the parameters, module tie-in references and administrative run directives may be created 426. This defines the simulation to be run in format readable by the action outcome simulation module. The simulation is then run, any post processing completed and the results displayed, possibly motion graphically through use of the observation state estimation service 140 with its game engine 140a and presentation manipulation scripting capabilities 140b, or possibly presented in some other format per the pre-design of authors of the simulation.

The middle panel 430, depicts a simulation for insurance or risk analysis which may be used to explore decisions or ventures where the large scale loss of capital is possible due to wholesale loss of market share, loss of infrastructure or capital equipment investment or loss existing infrastructure or capital equipment is possible among other scenarios known to those skilled in the field. Insurance simulation may take the form of simulating the events that might lead to an expensive liability payout or equipment payout such as the failure of large oil pipeline in a secluded area with subsequent release of a significant number of gallons of crude oil, necessitating a massive cleanup and possible environmentally based restitution, or many other possible examples imaginable by one skilled in the field. Capital, as an actor behaves the same, so creating multiple instantiations of it in a simulation is a waste of time and potentially computing resources. Capital is therefore treated as an aggregate much as the actors in a system dynamics-based simulation where all actors are aggregate agents of their real-world counterpart. As may be expected, the set-up phase of the simulation consumes the large majority of the steps as once simulation execution is initiated, the author must then only wait for and then interpret, possibly further manipulate the results 441. The process starts with the creation of administrative information 431, here such parameters as boundaries of data values to be used, the data store database origin or origins of data to be used, if more than one source exists, organizational operating system resource levels to be used, timing scheme to be used, progress indicators to be displayed and desired mode of display of the completed simulation may be just a few examples of a much larger set of administrative parameters known to those skilled in the art which may be specified. For any simulation, a reliably useful end result integrally depends on the proper configuration of the factors that will affect the actors of the simulation, forming the milieu in which they will perform their programmed actions, here designated the "world" 432. That the constraints and influences exercised by the configured factors of the world match those of the real-world under expected conditions of the simulation must be certain. Of equal importance is the proper configuration of the actors 433 modeling the real-world items within the simulation, again, reliable data concerning the behavior of each actor type and variants within actor types must closely match those of the real-world items under programmed simulation conditions. It is also important to carefully consider the selection of actor types and numbers of each type to be included in a simulation as this factor may change the outcome considerably and lead to conclusions contrary to reality if real-world proportions are far afield of those in the computer simulation. It is sometimes useful to place individual instances of a particular model (actor) type into one or more groups to measure not only how each individual behaves in the simulation but the overall results obtained from the group. The embodiment allows this by supporting actor populations to be specified 434. Successful completion of a real-world reliable simulation may be greatly augmented by the ability to compare the results of a partial simulation run with as much of the limited real-world data as is available or possibly even incorporating portions of that real-world data into the constituent parts of the simulation such as the world configuration 432, selection of actor model characteristics 433 and types and the generation of appropriate actor populations 434. The organizational operating system offers a mechanism for use of this potential advantage by allowing the simulation constituents listed to be attached as run parameters to the automated planning service module 439, bringing the inferential statistic and Monte Carlo heuristic algorithms into support in directing the intelligent inclusion and use of data from other modules of the organizational operating system for improvement of the course taken by the simulation when run to completion 439. Unlike the simple simulation described directly above 410, the rules and boundaries for the handling and reporting of capital flow within the simulation must be specified before the simulation is run 435. This may include items such as but not limited to total capital budget, how much capital loss can be tolerated in a single or specified number of simulation steps, whether profit should be placed higher than other considerations in some or all sets of the simulation, whether capital can be traded for brand recognition or confidence and many more potential choices that may be known to one skilled in the field. Accurate, reliable simulation of the element of risk is extremely complex and requires the inclusion of several additional actors within a risk inclusive simulation such as, but not necessarily limited to models for hazard present under the conditions of the simulation 436, one or more catalogs of events that may lead to or add to both the initiation of a cataclysmic condition or its aftermath 437, models of known vulnerabilities of all actors within the simulation 438 and finally, models that specify liability possibilities the insurance coverage or finance contracts pertinent to the actors present in the simulation 440 to be run along with the potential loss figures for chains of events possible to transpire under the contractual obligations currently in force 440. Due to the extreme complexity of each of these simulation areas, hazard 436, event occurrence 437, vulnerability of actors 438, and contract and loss potential models 440, the system also make use of the significant processing and predictive power of the automated planning service module 130 available to assist in initialization of and progression of the simulation including these models 449. At the end of the multiple, highly important configuration steps, simulation initialization file containing all of the parameters, module tie-in references and administrative run directives may be created 426. This defines the simulation to be run in format readable by the action outcome simulation module. The simulation is then run, any post processing completed and the results displayed, possibly motion graphically through use of the observation state estimation service 140 with its game engine 140a and presentation manipulation scripting capabilities 140b, or possibly presented in some other format per the pre-design of authors of the simulation. Due to the potential of multiple accidents which may result in the payment of very large sums of capital, this particular type of simulation may end with the system analyzing the policy portfolio of an underwriter to confirm that reserve capital is sufficient to cover a reasonable proportion of losses and premiums for individual corporations are in line with potential risk and resultant payout. 442

FIG. 5. is a diagram depicting the primary processing locations of individual components of an action outcome simulation module. As has been implied and might be expected given the complexities of simulation of various decision and venture progression and outcomes, multiple modules within the organizational software operating system that makes up the invention may be involved with processing. As would be expected all simulation policy 501 is present within and the actual execution of simulations 502 take place within the action outcome simulation module 540. The actor or model component 505, which holds the modeled representation of the real-world items that take part in simulation is associated primarily with the action outcome simulation module where it runs, but the rules 505a that make up its actions and influence boundaries may be either modified before or after simulation run within the automated planning service module, 130, 550 as previously indicated 400 and possibly the decomposable transformer service module 150 the functions of which have been described previously. Similar, but not identical, to the actor component, the world component, the parameters that influence the actions of all actors during simulation are found and executed in the action outcome simulation module, but in this case, both the individual world entity 510 and its policy rules of action and influence during execution may be processed both before simulation run and after run commencement in. The previously mentioned actor population component 515, while potentially important part of a plurality of simulations is in reality an aggregator rather than interacting directly with other components during simulation both it as a component of the simulation engine and the policy rules that make it up which has a framework derived from the world policy subcomponent 515a are entirely constructed and stored within the automated planning service module 130 and the decomposable transformer service module 150, 550 where weighting of the influence of certain individual actors and the total strength of population influence on the simulation may be coordinated to produce the most reliable, realistic end result of a simulation run. The last three components listed, hazard model 520, vulnerability model 525 and financial model 525 are all library like components included in specific simulations to enable the modelling of specific additional facets of a simulation not part of more simplistic simulation executions. It is extremely important, due to the gravity of the results of their effects on those facets which are of great importance to the simulation author who included them that these components 520, 525, 530 and the policy rules governing how they interact within simulation 520a, 525a, 530a, be as up-to-date with current real-world conditions and data in those areas as is possible and, indeed, much of the data which these three components supply are subject to continuous measurable update by sensors or web available data. It is therefore expected that their construction and upkeep be handled entirely by the modules of the organizational operating system tasked with the high speed accumulation and meaningful processing of externally available data followed by intelligent integration of the new data with relevant historical data already present, the multidimensional time series data store 120, previously described, directed computational graph 155, decomposable transformer service module 150, 545, and the automated planning service module 550 may all be responsible for the creation and upkeep of accurate useful hazard model 520, vulnerability model 525 and financial model 530 components.

It must be stated that the disclosed associations between specific simulation components and specific functions of the invention (modules of the embodiment) are illustrative and were described as the inventors believe such associations highly likely and productive during execution of simulation functions of the invention. Stating such example associations should not be taken to mean that other associations both during simulation execution and other processes are not possible or not made. They are possible and they are made, in the interests of brevity and comprehension associations of lesser impact were omitted from description. The invention is designed to allow the computing cooperation between any one function with any other function in the pursuit of the most accurate, timely predictive result possible at all times and all that may be needed in some few cases is some additional programming to promote unforeseen new functional association.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 10, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine- readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

In some embodiments, systems according to the present invention may be implemented on a standalone computing system. Referring now to FIG. 11, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

In some embodiments, systems of the present invention may be implemented on a distributed computing network, such as one having any number of clients and/or servers. Referring now to FIG. 12, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

FIG. 13 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51.

NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client.

The skilled person will be aware of a range of possible modifications of the various embodiments described above. Accordingly, the present invention is defined by the claims and their equivalents.

What is claimed is:

1. A distributed system for modeling of complex systems with large and complex datasets using a distributed simulation engine comprising:
   a plurality of distributed computing devices connected over a network, with each distributed computing device comprising at least a processor, a memory, and a network interface;
   wherein a plurality of programming instructions stored in one or more of the memories and operating on one or more of the processors of the plurality of distributed computing devices causes the plurality of distributed computing devices to:
automatically retrieve or receive a plurality of data from a plurality of sources over the network, wherein the sources include sensors and network devices that provide streaming data in near real-time;
create a world model for a simulation using parameters and the data from the plurality of sources, wherein the world model is configured to represent an aspect of the cyber-physical world, and wherein the world model comprises:
a plurality of constraints establishing boundary conditions matching those of the cyber-physical world under expected conditions of the simulation;
a plurality of actor models, wherein each actor model is configured to act independently of all other actor models within the boundary conditions, and wherein the actor models are configured to operate in parallel within the world model during operation of the world model; and
an environment monitoring layer configured to:
monitor each actor model within the world model during operation of the world model, wherein monitoring the actor models includes monitoring actions of the actor models, interactions between the actor models, and a state of the actor models at multiple points in simulated time;
store the monitored actions, interactions, and state of one or more of the actor models using graph-based information storage, and
pass control directives from the simulation to one or more of the actor models during operation of the world model;
run the simulation until a simulation result is achieved, wherein the simulation is structured to run multiple alternative decision pathways in parallel to generate multiple predictive outcomes;
while the simulation is running, store decision points and their corresponding parallel decision pathways using the graph-based information storage as they are generated, wherein each stored decision point includes a sequence, a context, and a state for the actions of each actor model and interactions among the actor models; and
generate one or more value-at-risk estimations based on the multiple alternative decision pathways by performing a plurality of statistical data analyses on the stored decision points and their corresponding decision pathways in the graph-based information storage based on the simulation parameters and the simulation result.

2. The distributed system of claim 1, wherein the statistical data analyses comprise information theory based statistical analysis.

3. The distributed system of claim 1, wherein the statistical data analyses comprise Monte Carlo heuristic model value at risk principles.

4. The distributed system of claim 1, wherein the distributed system is configured to allow jobs that run in a single iteration with a single set of parameters and jobs that include multiple iterations and sets of predetermined sets of parameters with termination criteria to stop execution when a desired simulation result is obtained.

5. The distributed system of claim 4, wherein some jobs are run offline in a batch mode and other jobs are run online in an interactive mode.

6. The distributed system of claim 1, wherein the simulation includes models for hazards, vulnerabilities, contractual obligations and financial capital loss.

7. The distributed system of claim 1, wherein the simulation result is used as feedback to a subsequently run simulation.

8. A computer-implemented method for modeling of systems with large and complex datasets using a distributed simulation engine on a plurality of distributed computing devices comprising the steps of:
automatically retrieving or receiving a plurality of data from a plurality of sources over a network, wherein the sources include sensors and network devices that provide streaming data in near real-time;
creating a world model for a simulation using parameters and the data from the plurality of sources, wherein the world model is configured to represent an aspect of the cyber-physical world, and wherein the world model comprises:
a plurality of constraints establishing boundary conditions matching those of the cyber-physical world under expected conditions of the simulation;
a plurality of actor models, wherein each actor model is configured to act independently of all other actor models within the boundary conditions, and wherein the actor models are configured to operate in parallel within the world model during operation of the world model; and
an environment monitoring layer configured to;
monitor each actor model within the world model during operation of the world model, wherein monitoring the actor models includes monitoring actions of the actor models, interactions between the actor models, and a state of the actor models at multiple points in simulated time;
store the monitored actions, interactions, and state of one or more of the actor models using graph-based information storage actions and interactions, and
pass control directives from the simulation to one or more of the actor models during operation of the world model;
running the simulation until a simulation result is achieved, wherein the simulation is structured to run multiple alternative decision pathways in parallel to generate multiple predictive outcomes;
while the simulation is running, storing decision points and their corresponding parallel decision pathways using the graph-based information storage as they are generated, wherein each stored decision point includes a sequence, a context, and a state for the actions of each actor model and interactions among the actor models; and
generating one or more value-at-risk estimations based on the multiple alternative decision pathways by performing a plurality of statistical data analyses on the stored decision points and their corresponding decision pathways in the graph-based information storage based on the simulation parameters and the simulation result.

9. The method of claim 8, wherein the statistical data analyses comprise information theory based statistical analysis.

10. The method of claim 8, wherein the statistical data analyses comprise Monte Carlo heuristic model value at risk principles.

11. The method of claim 8, further comprising the step of allowing jobs that run in a single iteration with a single set of parameters and jobs that include multiple iterations and sets of predetermined sets of parameters with termination criteria to stop execution when a desired simulation result is obtained.

12. The method of claim 11, wherein some jobs are run offline in a batch mode and other jobs are run online in an interactive mode.

13. The method of claim 8, wherein the simulation includes models for hazards, vulnerabilities, contractual obligations and financial capital loss.

14. The method of claim 8, further comprising feeding back the analysis simulation result as input to a subsequently run simulation.

15. A computer-readable, non-transitory medium comprising a plurality of programming instructions that, when operating on the plurality of distributed computing devices each comprising at least a processor, a memory, and a network interface, cause the plurality of distributed computing devices to carry out the method of claim 8.

* * * * *